Nov. 15, 1966 E. W. MADSEN 3,286,109
STEP MOTOR DAMPED BY A VISCOUS FLUID FILLING
Filed Feb. 17, 1964
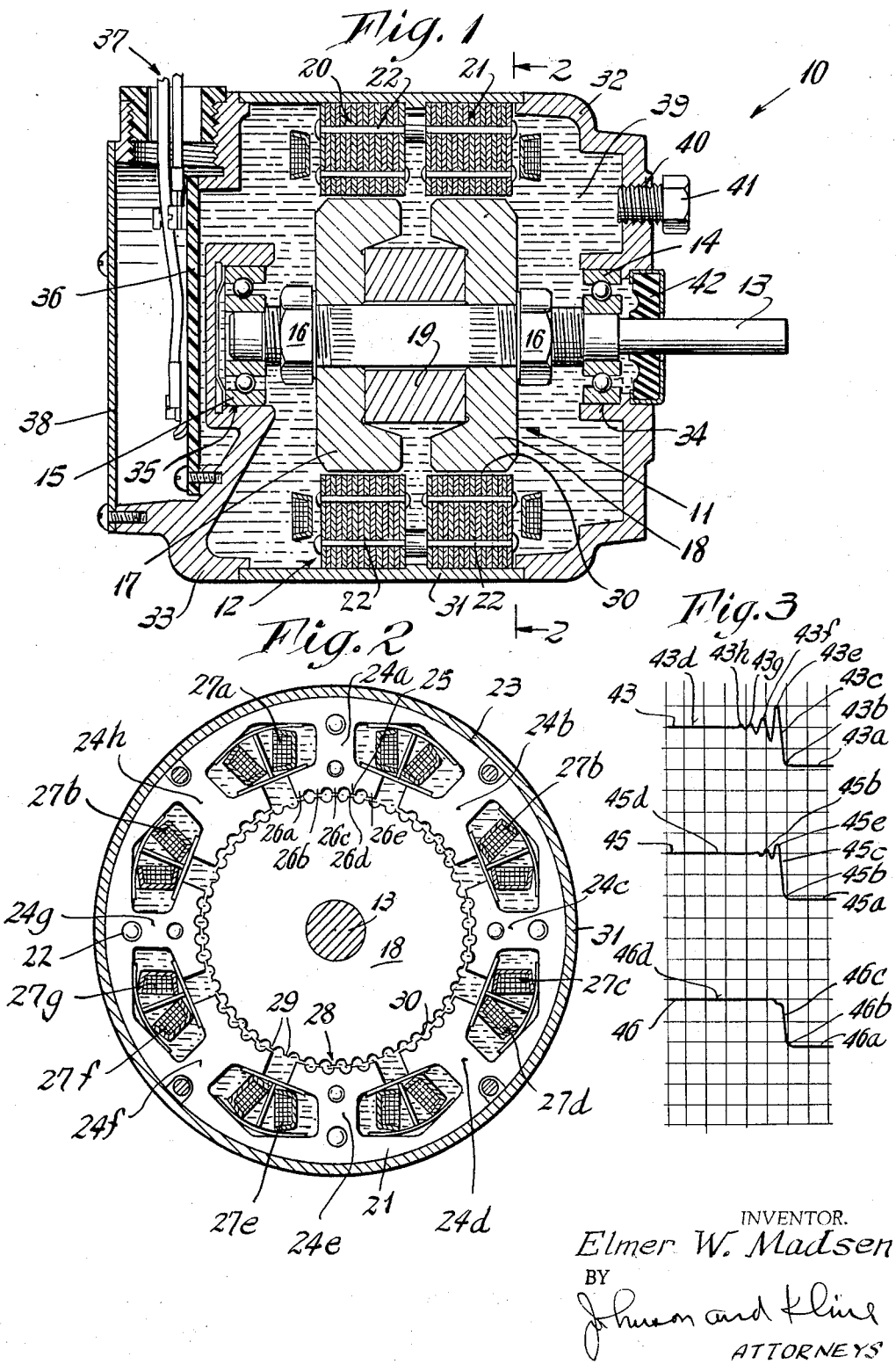
INVENTOR.
Elmer W. Madsen
BY
Johnson and Kline
ATTORNEYS

United States Patent Office 3,286,109
Patented Nov. 15, 1966

3,286,109
STEP MOTOR DAMPED BY A VISCOUS
FLUID FILLING
Elmer W. Madsen, Bristol, Conn., assignor to The Superior Electric Company, Bristol, Conn., a corporation of Connecticut
Filed Feb. 17, 1964, Ser. No. 345,145
6 Claims. (Cl. 310—49)

The present invention relates to an electric motor which produces a rotational movement and more particularly to such a motor in which the rotation consists of incremental steps with the motor being capable of being stopped at the termination of any step.

In United States Patents Nos. 2,931,929, granted April 5, 1960 and 2,982,872, granted May 2, 1961, and assigned to the assignee of the present application, there is disclosed one type of motor to which the present invention relates. This type of motor is a slow speed synchronous motor and has a stator assembly which includes pole pieces that extend inwardly and terminate in an inner periphery in which teeth are formed. Cooperating with the stator teeth is a rotor assembly that includes a shaft on which is mounted at least one radially extending member having a circular periphery in which teeth are also formed. When the motor has its windings associated with the polar projections energized either by two phase A.C. or controlled D.C. pulses, the shaft is caused to turn with a change in the energization of the windings and hence the magnetization of the pole pieces causing the shaft to move one-half a tooth pitch of the rotor teeth. Furthermore, if the energization of the windings is not changed the shaft will remain stopped and resist movement therefrom. Thus in such a motor the rotational movement of the shaft, which may be in either direction depending upon the manner of energization of the windings, consists of a plurality of substantially discrete incremental steps with the shaft being accelerated for each step from its last stop position to its next stop position where at the latter it is magnetically decelerated and held stationary until the next change in energization of the windings.

While this type of motor has been found very satisfactory, it has in some instances been found that the rapid deceleration of the shaft at the end of a step tends to cause a movement of the shaft which consists of oscillations of the shaft about the stop position of decreasing amplitude. In other words, the shaft may decreasingly rotationally vibrate about the stop position with the vibrations decreasing in amplitude until stopped. In many instances, the duration for the amplitude of the oscillations to become insignificant may be a length of time in which many steps could have been taken and thus even though the motor may have its speed or incremental steps per time interval increased, still the advantages resulting therefrom may thus not be completely usable because of the oscillations produced upon stopping.

It is accordingly an object of the present invention to provide an electric motor of the incremental stepping type in which the oscillations of the rotor assembly when stopped are substantially minimized and dampened.

A further object of the present invention is to achieve the above-noted result with a minimum of change in the existing structure of such motors and in which the change is exceedingly relatively economical.

A further object of the present invention is to provide in the above-noted type of electric motor for a decrease in the oscillations but yet in which there is little if any decrease in the torque and speed of such a motor.

In carrying out the present invention, in the particular embodiment of the invention herein described, there is provided an electric motor of the type having a plurality of pole projections, each of which has an inner periphery in which teeth are formed. The pole peripheries are preferably concentric such that the teeth lie substantially on a circle. Radially aligned with the teeth of the stator for magnetic cooperation therewith are teeth formed on a peripheral surface of a substantially cylindrical member, the latter being fast on a shaft that is mounted for rotation within a frame to which the stator is secured.

According to the present invention, the frame supports the cylindrical member and shaft which constitute part of a rotor assembly for rotation within a substantially fluid-tight chamber. This chamber is substantially filled with a viscous dampening liquid in the embodiment hereinafter specifically disclosed though it will be appreciated that a lesser amount of fluid may at times be found satisfactory. The rotor and stator teeth are substantially radially aligned and spaced close to each other, for example on the order of .005 inch and sufficient liquid is introduced into the chamber to at least occupy the gap existing between the teeth. Accordingly when the rotor assembly is stopped, it tends, as heretofore set forth, to oscillate about its stopped position but it has been found that the liquid substantially minimizes the oscillations. This may be attributed to the fact that the teeth of the rotor apparently act as vanes which increase the effective area of the rotor assembly on which the liquid may act if the liquid in the gap is stationary. If, on the other hand, the liquid in the gap is moving with the rotor, the teeth of the stator teeth apparently will perform the same function and thus in either event with respect to the liquid in the gap, it exerts a dampening effect on the oscillations of the rotor assembly. Moreover, the effect may be adjusted by the selection of fluids having different viscosities.

Other features and advantages will hereinafter appear.

In the drawing:

FIGURE 1 is an axial cross-section of the electric motor of the present invention.

FIG. 2 is a cross-section taken on the line 2—2 of FIG. 1.

FIG. 3 is a group of lines denoting the movement of the rotor shaft when energized for one incremental step under different conditions.

Referring to the drawing, the motor is generally indicated by the reference numeral 10 and includes a rotor assembly 11 and a stator assembly 12. The rotor assembly 11 has a shaft 13 that is rotatably mounted in bearings 14 and 15 and secured on the shaft 13, as by nuts 16, are a pair of end caps 17 and 18. The end caps each have the cross-sectional shape shown and engage the opposite ends of a permanent magnet 19 positioned therebetween. The magnet 19 is polarized axially and hence the end cap 17 will have one magnetic polarity and the end cap 18 the other, these two end caps being preferably formed of paramagnetic material, such as sintered iron.

The stator assembly 12 includes a pair of stator stacks 20 and 21 consisting of identical laminations of paramagnetic strip material held together as by rivets 22. Referring to FIG. 2, each lamination has the planar shape shown to define an outer circular periphery 23 and a plurality of equally spaced inwardly projecting pole pieces 24a through 24h. Referring to the pole piece 24a it is formed to have an inner arcuate periphery 25 on which projecting teeth 26a through 26e are located. The other pole pieces are identical and thus also have an inner periphery which is arcuate and formed with axially extending teeth with the peripheries of the pole pieces lying substantially on a circle having an axis concentric with the axis of the shaft 13 and thus define a surface that is substantially cylindrical.

In accordance with the heretofore mentioned U.S. patents, there are provided windings 27a through 27h which are employed to produce a magnetic polarity in their associated pole piece. There is one winding for each pole piece and the magnetic polarity of the pole piece depends on the direction of energization of its winding. The windings, as is well known, may be either energized by two phase alternating current or preferably may be energized by a direct current whose polarity for each of the windings may be controlled by an appropriate circuit.

The end caps 17 and 18, FIG. 2, are annular and symmetrical with specifically the end cap 18 having an outer periphery 28 that is substantially cylindrical on which teeth 29 are formed. The teeth extend axially thereof with the center of the periphery being that of the shaft 13. The end cap 17 is similar in shape and thus has axially extending teeth. The end caps are located to have their outer peripheries radially aligned with the inner peripheries of the stator stacks with a small gap 30 existing therebetween.

The stator stacks 20 and 21 are secured to a tubular member 31 formed of paramagnetic material, as by a force fit, and at one end of the member 31, en end bell 32 is secured having the shape shown while the other end of the member 31 has an end bell 33 secured thereto. The end bell 32 supports, as at 34, the bearing 14 while the end bell 33, as at 35, supports the bearing 15. In addition, secured on the end of the end bell 33 is an insulating disk 36 to which input connecting wires 37 may be secured with the appropriate connections extending through the insulating disk to the windings 27a through 27h. If desired, a closing plate 38 may be employed to close off the connections on the disk 36.

In accordance with the present invention the members 31, 32, 33 and 36 constitute a frame which defines a chamber in which the stator and rotor assemblies are positioned. The chamber, generally indicated by the reference numeral 39, is formed to be fluid-tight though a threaded inlet 40 which may be blocked as by a screw 41 is provided to enable the introduction of a fluid into the chamber with the screw being air vented if desired. In addition, to increase in the fluid-tightness of the chamber, a fluid seal 42 may be positioned in the end bell 32 and circumscribe the shaft 13.

The motor of the present invention may be caused to move one-half a tooth pitch of the rotor teeth by changing or reversing the direction of energization of the windings and hence the magnetic polarity of the pole pieces. Thus referring to FIG. 3, line 43 represents the movement of the shaft 13 when the shaft is advanced just one step. In order to appreciate the significance of the line 43, it will be understood that the horizontal lines in this figure denote rotative positions of the shaft 13 and the vertical lines denote duration of time. The latter may for example be 20 milliseconds between lines starting from the right and extending leftward. At the point 43a, the shaft is at rest and a change in the direction of energization of the winding occurs at the point 43b. The shaft quickly accelerates, as shown by the inclined line 43c, to stop position indicated by the horizontal line 43d. However, it will be appreciated that the shaft fails to assume the position 43d but instead moves with oscillations of decreasing amplitude about the stop position 43d, as indicated by the crests 43e, 43f, 43g, 43h of the waves in the line 43.

It will thus be appreciated that even though the shaft advances to the stop position, i.e., the desired end of the incremental advance, it goes beyond said position and finally oscillates itself about said position until it eventually ceases movement. It will be also understood that the time required for the shaft to move from the position 43a to the position 43d on the line 43c is short compared to the length of time required for the shaft to come to rest at the stop position 43d.

In many instances such an oscillation movement of the shaft after achieving the stop position has been found detrimental and according to the present invention such oscillation movement is substantially minimized if not eliminated by filling the chamber 39 with a liquid 44 of a determined viscosity. As the chamber is fluid-tight, the fluid is contained within the chamber without unsatisfactory leakage. In addition, while the fluid is shown in FIG. 1 as completely occupying the chamber 39 it is at least desirable that sufficient fluid be introduced so that the gap 30 has fluid therein and thus a lesser amount of fluid than that shown may be employed provided there is sufficient quantity to achieve the desired dampening of the oscillations. The fluid after the assembly of the motor may be easily introduced into the chamber through the inlet 40. The fluid 44 is preferably of the type that is nonconducting and maintains a substantially constant viscosity over a wide range of ambient temperatures.

As shown in FIG. 3, the line 45 is a line similar to line 43 showing movement of the shaft in rotating one incremental step with the exception that the motor has the fluid 44 within the chamber. Thus the shaft starts at the line 45a with a change in energization of the windings occurring at the point 45b and the shaft thus accelerates along the inclined line 45c to the stop position 45d. However, the fluid within the chamber serves to dampen the oscillation movement of the shaft at the stop position and thus though there are crests of oscillations 45e, 45f, they are smaller in magnitude than the crests of the oscillations in the line 43 and also lesser in number. Accordingly, the shaft is at rest at the stop position 45d in a time interval which is much smaller than that which occurs without the fluid in the chamber of the motor.

Shown by the line 46 is the movement of a shaft with a more viscous fluid in the chamber of the motor than the fluid therein when the movement shown by line 45 was produced. Thus there is a starting position 46a, stop position 46d, a winding energizing position 46b and instead of having a plurality of oscillations about the stop position 46d, only a small, in effect half, oscillation occurs and it occurs prior to the achievement of the stop position. Thus in this embodiment with a more viscous liquid there is no overshooting of the shaft beyond its stopping position and oscillation thereabout.

As heretofore set forth the vertical lines in FIG. 3 denote time intervals and hence the angle of the lines 43c, 45c and 46c portrays the acceleration of the shaft 13 in each of the conditions. It will be appreciated that the inclination of these three lines is substantially identical and for this reason it has been found that the speed and torque characteristics of the present motor have little, if any, change therein by reason of the introduction of the fluid 44 into the chamber. Moreover, as such a motor, even when running at full speed, moves with incremental discrete steps, it will be clear that the fluid also aids to prevent the oscillation at the end of each of the steps and thus produces a smoother running motor.

It is believed that the results obtained by the fluid 44 in decreasing the rotational oscillations of the shaft 13 about the stop position results from dampening fluid being in the gap 30. It will be appreciated that the gap 30 is defined on its inner periphery by the rotor teeth 29 which in effect with respect to the fluid 44 in the gap appears to be vanes and hence provides an increased area on which the fluid may act. Similarly the teeth 26 on the inner peripheries of the pole pieces also provide an increased area on which the fluid may react. Thus irrespective of whether the fluid is moving with the rotor in the gap 30 or whether it is stationary, there still exists either on the teeth 29 or the teeth 26, an increased area of contact on which the fluid that is moving relative thereto may react.

It will accordingly be appreciated that there has been disclosed an electric motor of the incremental stepping type in which a change in energization of the windings effects an incremental movement of the rotor shaft. Such a movement has heretofore resulted in a rotational oscillation of the shaft about its stop position. However, according to the present invention, such an oscillation is substantially minimized if not eliminated efficiently and effectively by merely forming the frame to be a fluid-tight chamber and introducing therethrough a viscous dampening liquid. The liquid cooperates with the teeth formed on the stator assembly and the rotor assembly to resist movement of the rotor with respect to the stator and particularly minimize the oscillations occurring about the stopped position after each step.

Variations and modifications may be made within the scope of the claims and portions of the improvements may be used without others.

I claim:

1. An electric motor of the incremental rotational stepping type comprising a stator assembly having an inner periphery substantially defining a cylinder, a rotor assembly including a shaft and at least one radially extending member having a substantially cylindrical outer periphery formed with rotor teeth, and means mounting the rotor assembly to have the periphery of the member radially aligned with the inner periphery of the stator with a small gap existing therebetween, said means including a frame defining a fluid-tight chamber in which the stator and rotor peripheries are located, and a quantity of viscous dampening fluid within said chamber at least at the gap, said fluid having a viscosity which dampens the oscillations occurring in the rotor assembly when said shaft is stopped at the end of a step.

2. An electric motor of the incremental rotational stepping type comprising a stator assembly having an inner periphery formed to provide stator teeth and substantially defining a cylinder, a rotor assembly including a shaft and at least one radially extending member having a substantially cylindrical outer periphery formed with rotor teeth, and means mounting the rotor assembly to have the rotor teeth radially aligned with the stator teeth with a small gap existing therebetween, said means including a frame defining a fluid-tight chamber in which the stator and rotor teeth are located, and a quantity of viscous dampening fluid within said chamber at least at the gap, said fluid having a viscosity which dampens the rotational oscillations occurring in the rotor assembly when said shaft is stopped at the end of a step.

3. An electric motor of the incremental rotational stepping type comprising a stator assembly having a plurality of inwardly extending pole pieces with the inner peripheries of the pole pieces being formed with stator teeth and substantially defining a cylinder, said pole pieces being separated from each other and a winding magnetically associated with each pole piece, a rotor assembly including a shaft and at least one radially extending member having a substantially cylindrical outer periphery formed with rotor teeth, and means mounting the rotor assembly to have the rotor teeth radially aligned with the stator teeth with a small gap existing therebetween, said means including a frame defining a fluid-tight chamber in which the stator and rotor teeth are located, and a quantity of viscous dampening fluid within said chamber at least at the gap, said fluid having a viscosity which dampens the rotational oscillations occurring in the rotor assembly when said shaft is stopped at the end of a step.

4. An electric motor of the incremental rotational stepping type comprising a stator assembly having an inner periphery substantially defining a cylinder, a rotor assembly including a shaft, a permanent magnet mounted on the shaft and polarized axially, an annular end cap at each end of the magnet with each end cap having a substantially cylindrical outer periphery formed with rotor teeth, and means mounting the rotor assembly to have the rotor teeth of the end caps radially aligned with the stator teeth with a small gap existing therebetween, said means including a frame defining a fluid-tight chamber in which the stator and rotor teeth are located, and a quantity of viscous dampening fluid within said chamber at least at the gap, said fluid having a viscosity which dampens the rotational oscillations occurring in the rotor assembly when said shaft is stopped at the end of a step.

5. The invention as defined in claim 1 in which the frame includes an inlet to said chamber for introducing the fluid thereinto and closing means for said inlet.

6. An electric motor of the incremental rotational stepping type comprising a stator assembly having a plurality of inwardly extending pole pieces with the inner peripheries of the pole pieces being formed wtih stator teeth and substantially defining a cylinder, said pole pieces being separated from each other and a winding magnetically associated with each pole piece, a rotor assembly including a shaft, a permanent magnet mounted on the shaft and polarized axially, an annular end cap at each end of the magnet with each end cap having a substantially cylindrical outer periphery formed with rotor teeth, and means mounting the rotor assembly to have the rotor teeth of the end caps radially aligned with the stator teeth with a small gap existing therebetween, said means including a frame defining a fluid-tight chamber in which the stator and rotor teeth are located, and a viscous dampening fluid substantially filling said chamber at least to fill the gap, said fluid having a viscosity which dampens the rotational oscillations occurring in the rotor assembly when said shaft is stopped at the end of a step with the step being produced by a change in magnetization of the pole pieces.

References Cited by the Examiner

UNITED STATES PATENTS

| | | | |
|---|---|---|---|
| 2,822,694 | 2/1958 | McKenney | 74—5.5 |
| 2,931,929 | 4/1960 | Snowdon | 310—156 |
| 2,955,472 | 10/1960 | Krupick | 74—5.5 |
| 2,982,872 | 5/1961 | Frederickson | 310—156 |
| 3,054,304 | 9/1962 | Jursik | 74—574 |
| 3,060,752 | 10/1962 | Johnson | 74—5.5 |
| 3,183,724 | 5/1965 | McQuillen | 74—5.5 |
| 3,197,659 | 7/1965 | Marshall | 310—49 |
| 3,211,935 | 10/1965 | Sones | 310—87 |

MILTON O. HIRSHFIELD, *Primary Examiner.*

J. W. GIBBS, *Assistant Examiner.*